Figure 1:
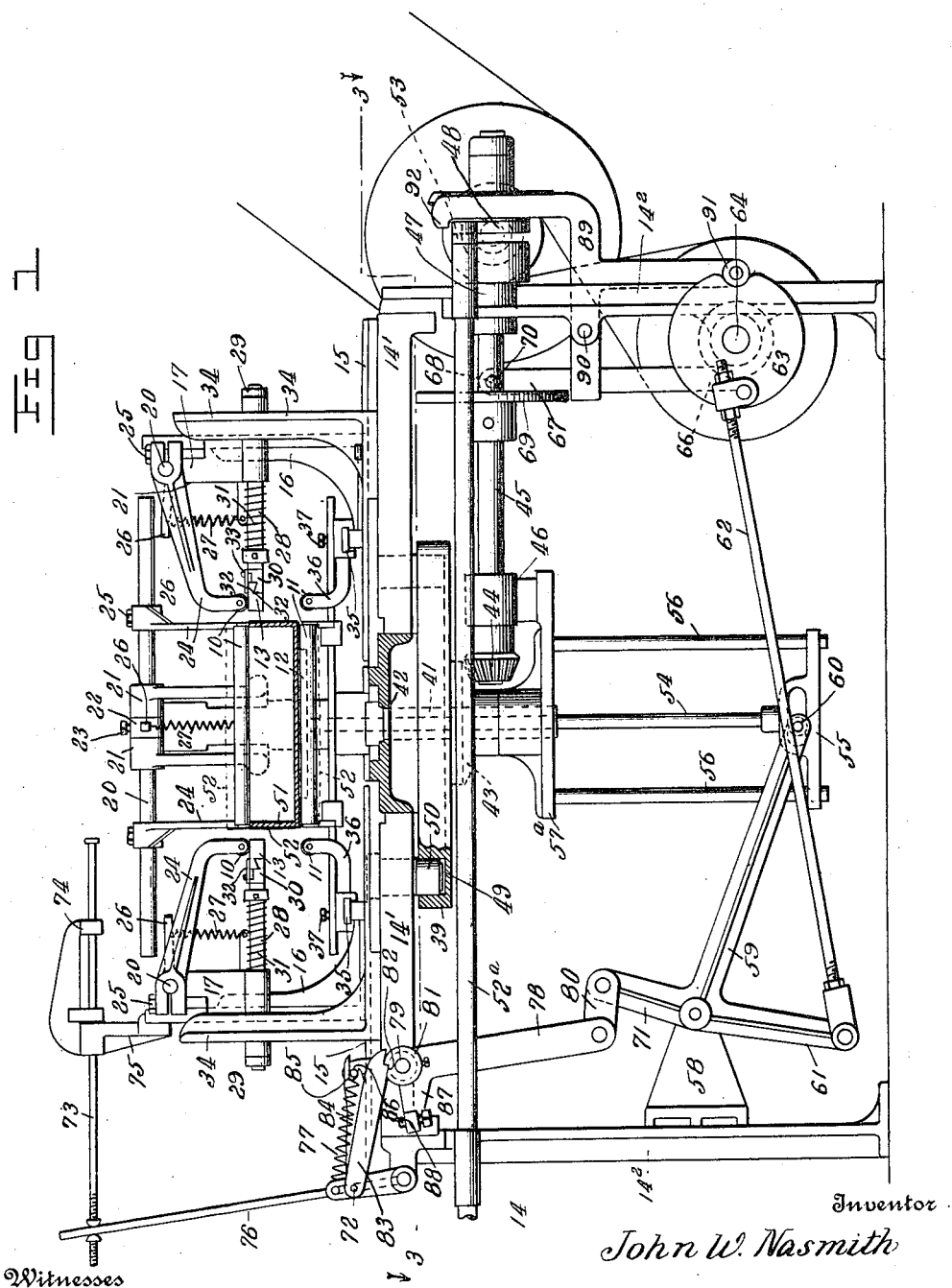

J. W. NASMITH.
BOX COVERING MACHINE.
APPLICATION FILED SEPT. 9, 1911.

1,046,484.

Patented Dec. 10, 1912.

7 SHEETS—SHEET 1.

Witnesses

Inventor
John W. Nasmith
By Meyers, Cushman & Rea
Attorney

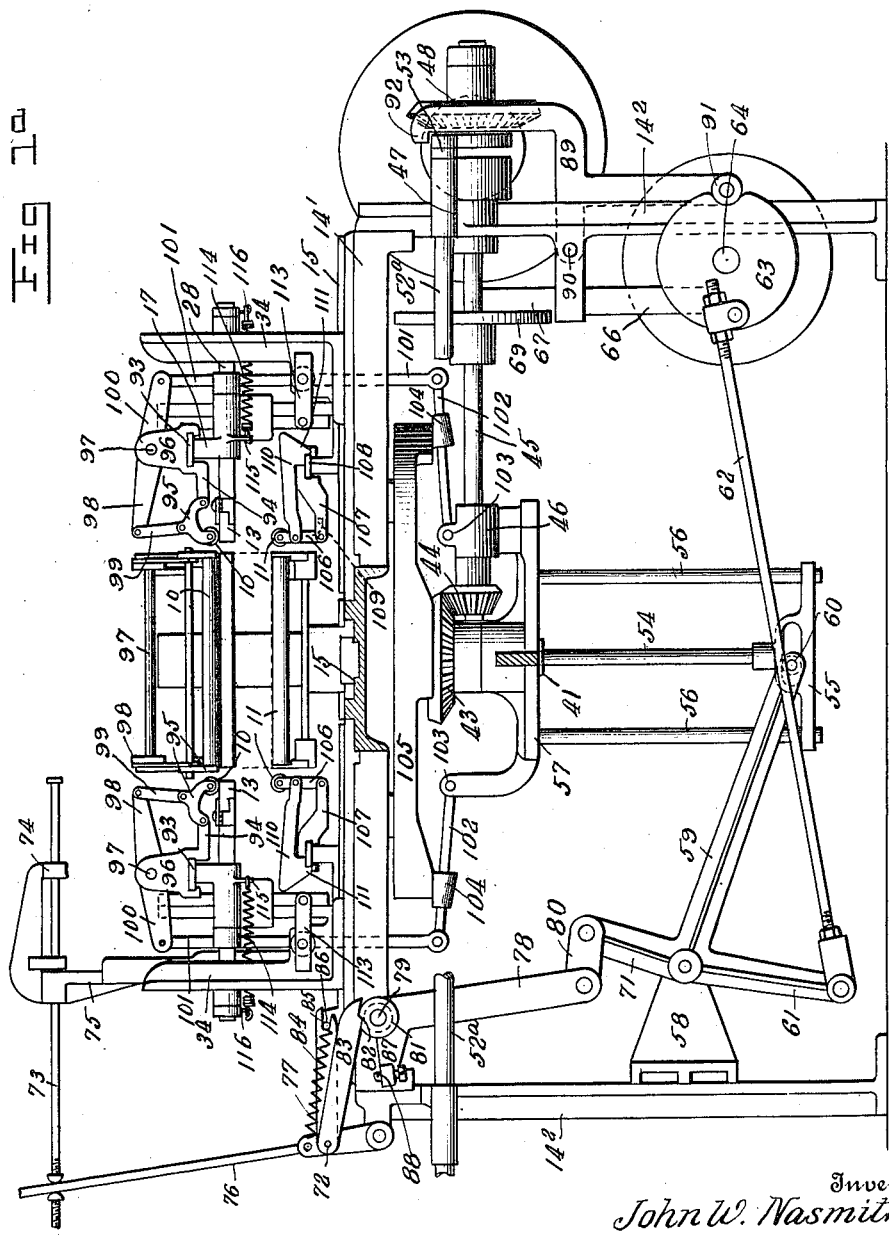

J. W. NASMITH.
BOX COVERING MACHINE.
APPLICATION FILED SEPT. 9, 1911.

1,046,484.

Patented Dec. 10, 1912.
7 SHEETS—SHEET 3.

Witnesses
H. A. Robinette
T. P. Barbay

Inventor
John W. Nasmith

By Meyers, Cushman & Rea
Attorney

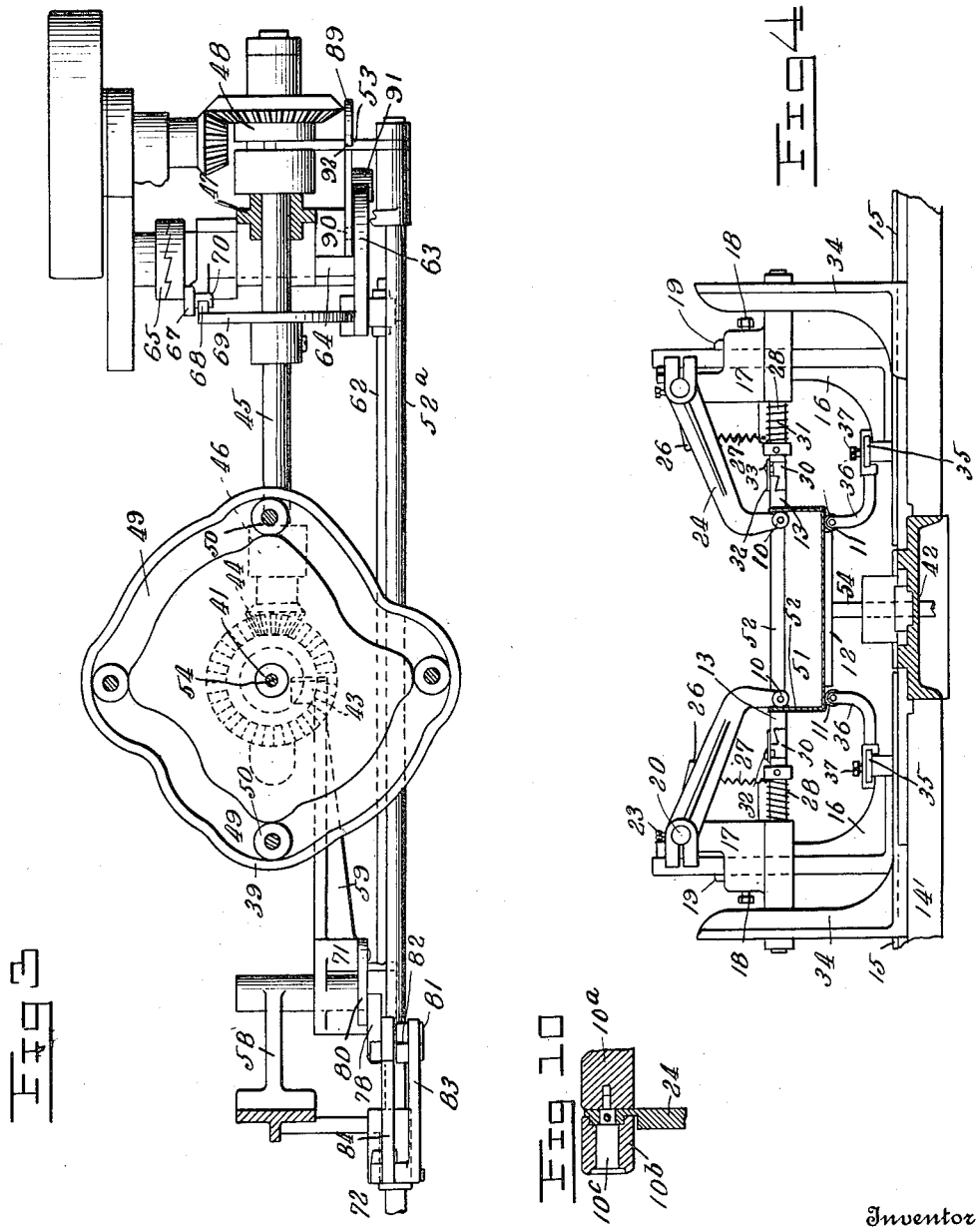

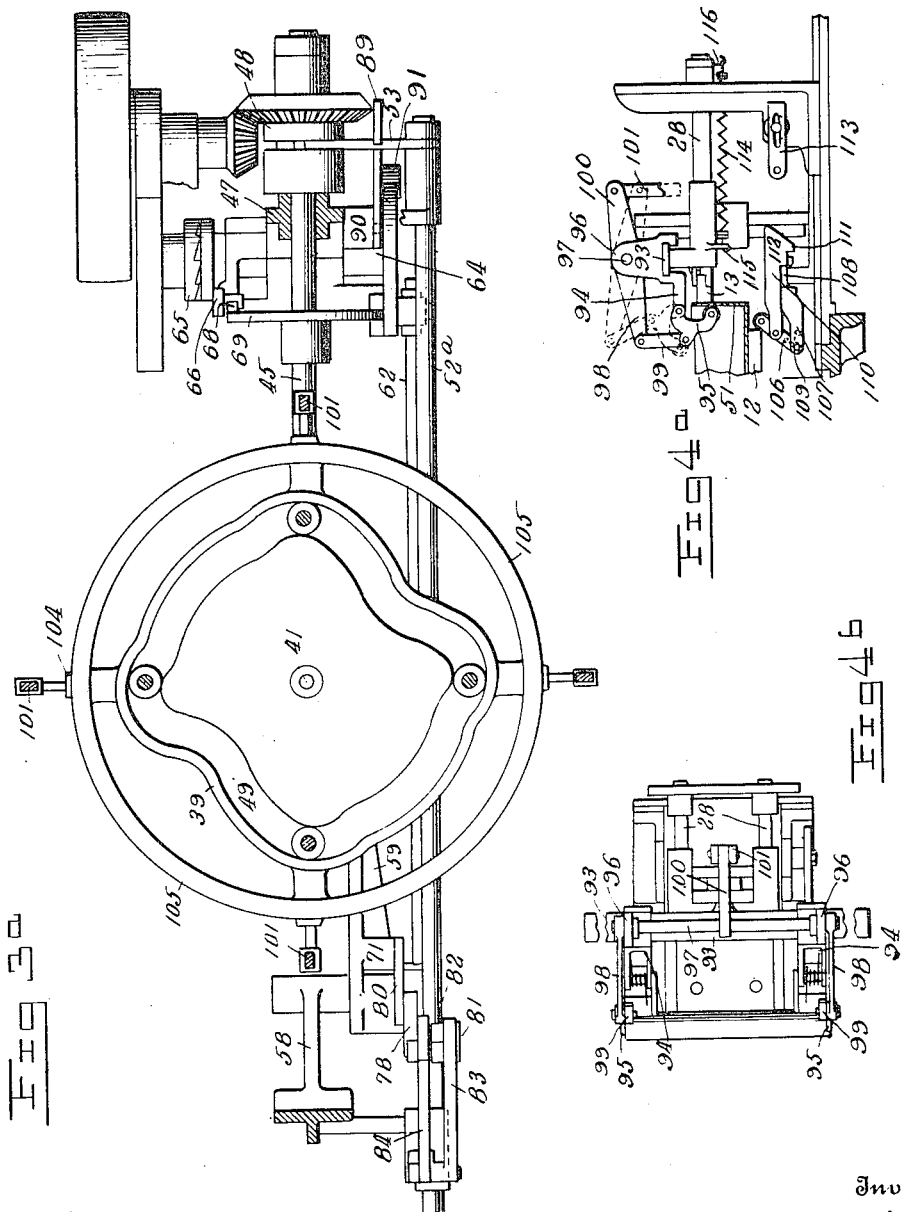

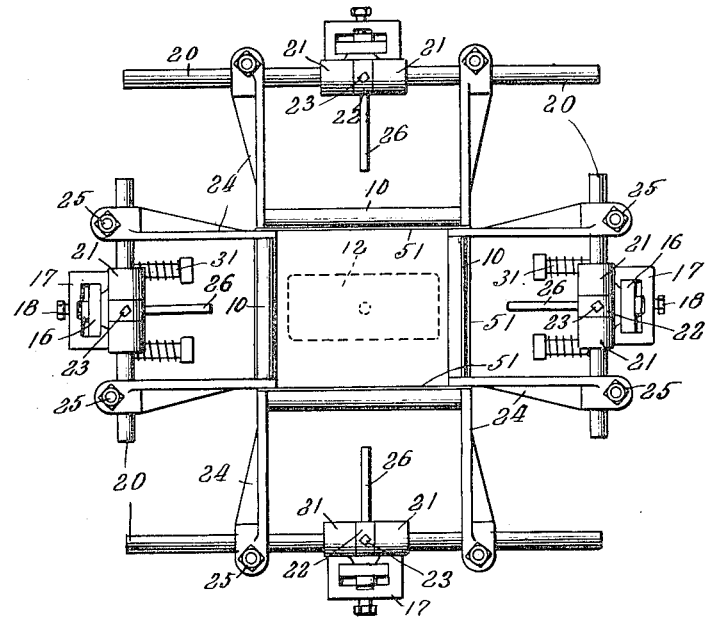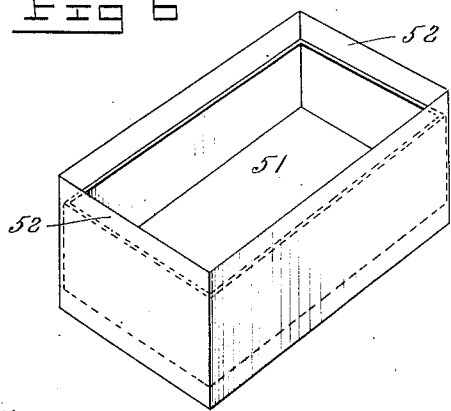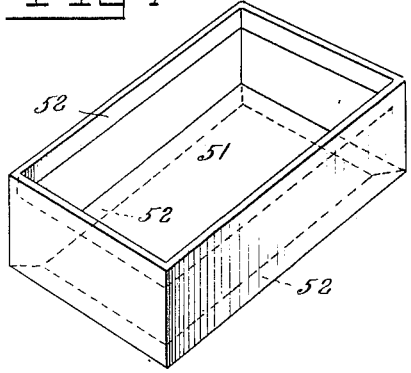

J. W. NASMITH.
BOX COVERING MACHINE.
APPLICATION FILED SEPT. 9, 1911.

1,046,484.

Patented Dec. 10, 1912.

7 SHEETS—SHEET 7.

Inventor
John W. Nasmith

Witnesses

By Meyers, Cushman & Rea
Attorney

UNITED STATES PATENT OFFICE.

JOHN WILLIAM NASMITH, OF MANCHESTER, ENGLAND.

BOX-COVERING MACHINE.

1,046,484.             Specification of Letters Patent.      Patented Dec. 10, 1912.

Application filed September 9, 1911. Serial No. 648,553.

*To all whom it may concern:*

Be it known that I, JOHN WILLIAM NASMITH, a subject of the King of Great Britain, residing at Manchester, England, have invented new and useful Improvements in Box-Covering Machines, of which the following is a specification.

This invention relates to box covering machines, and has particular reference to a box banding or stripping machine provided with improved apparatus adapted to turn in and press to a box the edges of a strip of paper, or the like. Heretofore in banding machines of this character the band or strip is glued to the sides and ends of the box to extend its edges beyond the top and bottom edges of the box. A form of machine heretofore devised is provided with a table receiving the box coming from the banding device, and in which the edges of the band are turned in and pressed over the top edge and against the bottom of the box by four pairs of rollers arranged on slides opposite to the four sides of the table. These rollers are adapted to be advanced and retired manually by lever mechanism, and in sets, and when advanced, the upper roller of each pair passes above the lower roller which is below the box. The upper roller of each set is adapted to roll down over the top edge of the box under the action of a spring and cam, or springs alone, and so turns down and presses the top edge of the band upon one side of the box while the lower roller presses under the bottom of the box and turns in and presses the band to the bottom of the box.

An object of this invention is to improve the construction of such apparatus, and to effect this, means are provided for rendering the machine adjustable to receive boxes varying in size, and particularly an improved holding frame for the box which is not only adjustable to suit the size of the box, but which also allows the banded box to be dropped into place without interfering with the projected edges of the band.

Another object of this invention is to provide means to operate the applying or turning-in rollers and their supporting slides from a single cam, and to provide an automatic ejecting means for the finished box.

According to this invention the pairs of rollers are supported on slides moving in guides carried by a frame and arranged in the form of a cross. These slides are moved into and out of operative positions at the desired moments by means of a cam, provision being made for adapting the rollers to suit boxes of varying lengths and widths. The box is held in an expanding frame, arranged, when the machine is at rest, to be open to a size considerably larger than the box to be operated upon, so that the banded box may be dropped into position without interference with the projecting edges of the band. When the machine is operated the frame closes in upon the box and holds it firmly, adjustable stops being provided to prevent crushing of the box. This expanding frame is conveniently operated by means of the cam controlling the movements of the roller slides. When the covering of the box is completed, the box holding frame is opened and the ejecting mechanism is automatically brought into action and ejects the finished box.

Figure 2:
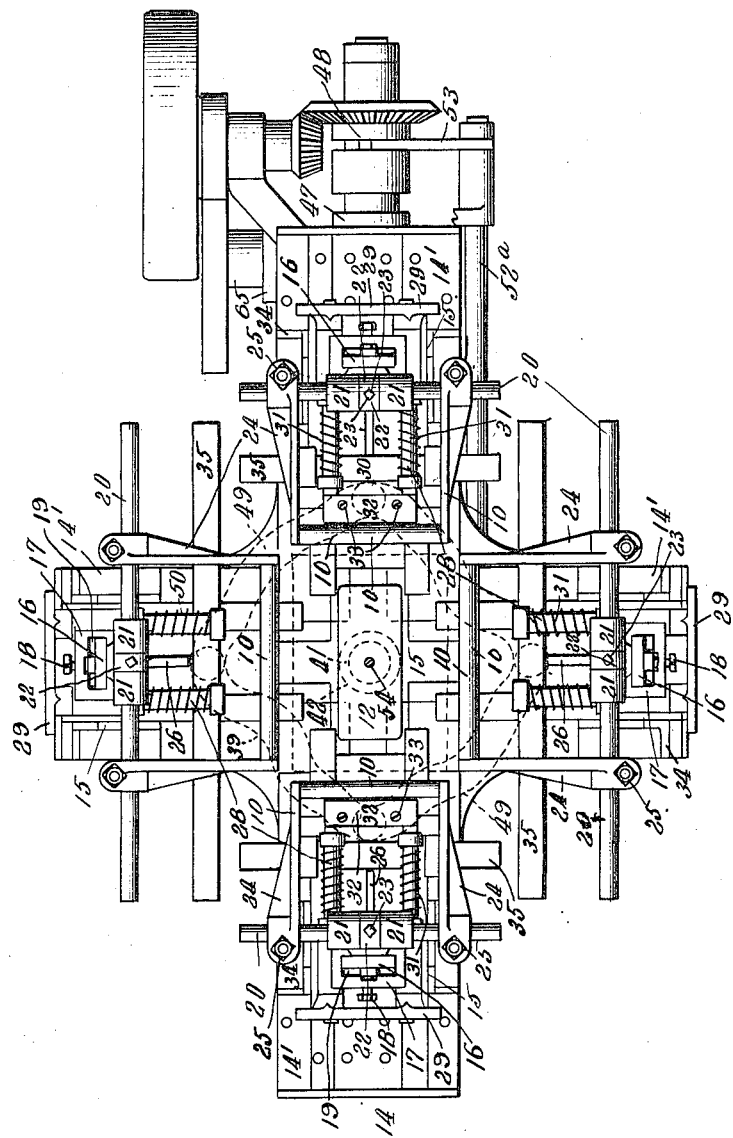
Figure 8:
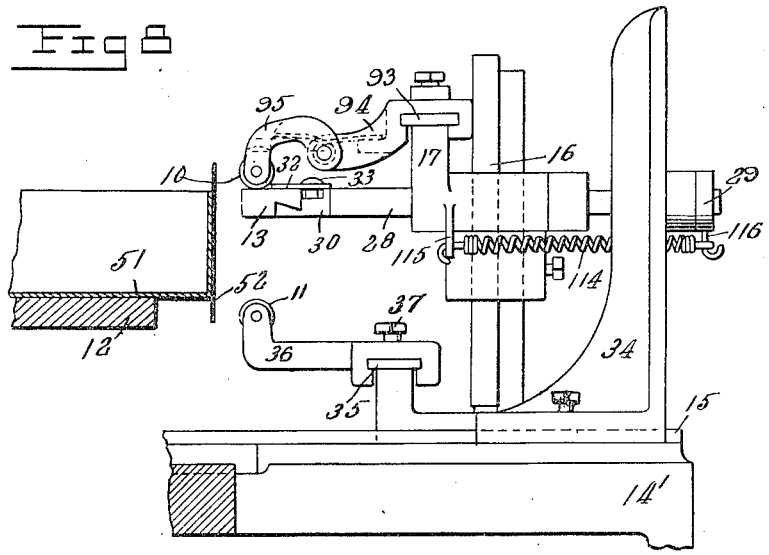
Figure 9:
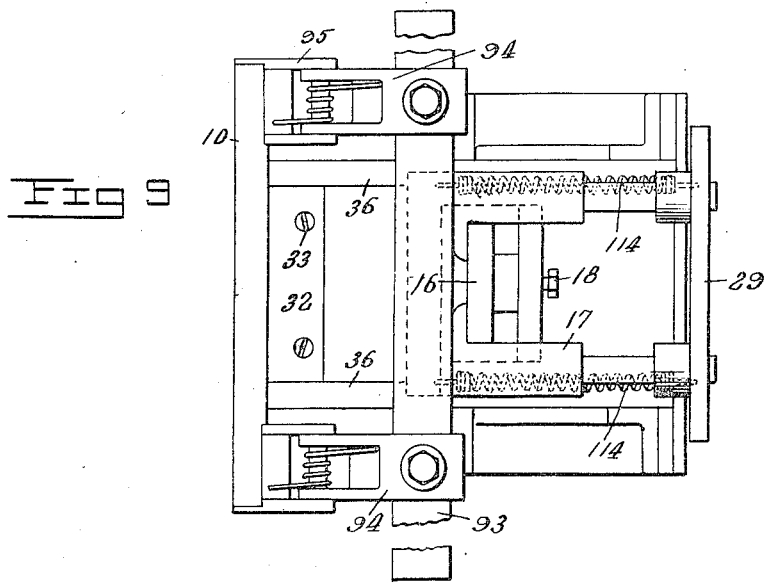

For a more complete understanding of the invention, reference is to be had to the following detail description, and the accompanying drawings, in which:

Figure 1 is a side elevation of the improved box covering machine disclosing parts of the same in section. Fig. 2 is a top plan view of the machine, certain parts being omitted. Fig. 3 is a section on the line 3—3 of Fig. 1 in the direction of the arrow, disclosing the operating mechanism. Fig. 4 is a side elevation of the main mechanism of the machine, disclosing the several operating devices in position as operating upon a rectangular box. Fig. 5 is a plan view of the same, disclosing the turning-in mechanism in the same position as set forth in Fig. 4. Fig. 6 is a detail perspective view of a box having the strip applied thereto ready to be turned in. Fig. 7 is a similar view, disclosing the edges of the covering turned in and as completed by the machine. Fig. 8 is an elevation of a modification of the turning-in device. Fig. 9 is a plan view of the same. Fig. 10 is a detail sectional view of a modified form of turning-in device and its mounting. Fig. 1ª discloses a modification of the showing of Fig. 1. Fig. 3ª is a view of the same, similar to Fig. 3. Fig. 4ª is a view similar to Fig. 4 disclosing the structure of Fig. 1ª. Fig. 4ᵇ is a plan view of the same.

In the drawings, in which like numerals designate similar parts throughout the several figures, and referring first to Fig. 1, the turning-in mechanism generally comprises a plurality of pairs of upper and lower turning-in tools 10 and 11, normally spaced away from a central box supporting means in the form of a table 12, and means for moving these turning-in tools 10 and 11 into and out of operative positions with respect to the supporting table 12. The turning-in tools shown are in the form of rollers, and the means for moving them is adapted to reciprocate them in substantially horizontal planes toward and from the sides of the table 12, the latter being also horizontal. The action of the lower rollers 11 is to turn the bottom edges of a covering applied to the sides of a box (see Figs. 4, 5, 6 and 7) to the bottom of the box, while the function of the upper turning-in rollers 10 is to turn the upper edges of the covering over the upper edges of the box and down within the box against the inner side walls, the edges being in each case held in turned-in position by means of suitable adhesive, which is applied to the covering usually prior to the application of the covering to the box. In order to support the side walls of the box against buckling or bending under the strains imposed during the operation of the turning-in tools, a supporting frame 13 is used being adapted to be placed with its sides against the walls of the box during the time that the covering is being turned in (see Figs. 4 and 5). In prior machines of this description the supporting frame 13 is in the form of a continuous band of metal or other material adapted to be placed by hand around the box being operated upon, and the turning-in tools are arranged for manual operation.

My invention contemplates making the various operative parts of the machine adjustable to suit any size of box within given limits; the automatic operation of such parts, and in addition contemplates certain improvements in the turning-in devices and their associated mechanisms, the machine being reorganized with its elements forming new combinations to the securement of a far greater efficiency.

14 is the main supporting frame of the machine of my invention. The main body of the frame 14′ lies in a horizontal plane and is supported by legs 14². The machine shown is adapted for operation upon rectangular boxes and to this end is provided with four ways 15 at right angles to each other, radiating from a central box support or table 12 aforementioned. On each of these ways is a slidable and adjustable bracket shaped carrier member 16. This member carries the upper and lower turning-in tools 10 and 11 and the elements of the supporting frame 13. The carrier members are angle shaped, one branch being arranged toward the table 12 and the other branch pointing upwardly. At the upper end of the latter branch of each carrier is arranged a sliding member 17, Figs. 1 and 4, adapted to adjustably slide up and down on this upper arm of the carrier member 16 and to be held in adjusted position by a set screw 18 passing through it and engaging a clamping shoe 19 on the back of the carrier arm. At the upper end of the supporting member 17 is fixed transversely a shaft 20, the shaft being journaled in spaced ears 21, Fig. 2, formed on the supporting member and being held in its journals by a collar 22 on the shaft, the collar being provided with a set screw 23 for fixing it to the shaft. Adjustably mounted on each end of each shaft is a pair of supporting arms 24, the inner ends of each pair of supporting arms carrying one of the upper turning-in tools 10, of which there are four in the complete machine, as shown. The outer ends are bored to receive the shaft 20, and are split to the bore as shown, and clamping screws 25 are provided extending transversely of the slits for the purpose of securing the arms in any adjusted positions on the transverse shaft 20. Thus it is evident that a turning-in tool in the form of a roller 10, of any desired length to suit the size of the box to be covered may be supported between each pair of arms 24, it being only necessary to spread or contract the arms laterally on the shaft 20 to accommodate the roller desired. The collar 22 aforementioned is provided with an inwardly extending arm 26 which is normally pulled downwardly by means of a spiral spring 27, the upper turning-in roller 10 being thus normally urged downwardly by the shaft 20 and the supporting arms 24 at all times.

Normally, the turning-in tools 10 rest upon the upper sides of the frame members 13, as shown in Fig. 1. The frame members 13 are made in sections, one section corresponding to each turning-in tool and being, like the turning-tools, arranged in accordance with the size of the box to be operated upon. The sections of the supporting frame 13 are removably attached one to each carrier member 16. Two spaced rods 28 pass through the body of the carrier, as shown in Fig. 1, being joined at their outer ends by a bar 29 and at their inner ends by a bar 30. The rods are forced inwardly by springs 31 surrounding them and which bear at one end against the carrier 17, as shown in Fig. 1, the other end against the bar 30. The bar 30 is gained on its inner edge, as shown in detail in Fig. 8, and supports a section of the frame 13 on the gained portion, the section being correspondingly gained and removably held in position by means of a clamping plate 32 and screw 33. Thus a section of any desired dimension may be placed in position. Although normally urged inwardly, inward movement of the sections of the frame is limited in each case by a pair of bracket shaped stops 34 adjustably mounted on the frame 14' one on each side of the carrier and positioned to engage the laterally extended ends of the bar 29.

On the lower branch of each carrier 16 is supported one of the lower turning-in rollers 11, of which there are four such rollers. There is provided a transversely fixed way in the form of a bar 35 at the inner end of each lower branch. Laterally adjustable arms 36, which slidably embrace the bar 35 at their inner ends and which may be secured in adjusted position by a set screw 37, support at their inner ends the lower turning-in rollers 11. Thus it will be seen that by moving the adjustable arms 36 laterally, a turning-in roller of any desired dimension to suit the size box being covered may be placed in position and supported by the arms 36. The adjacent bars or ways 35 are placed in different planes as shown in Fig. 1, whereby irrespective of the length of the bars, they may be moved one over the other, as the carriers are moved and without interference.

All of the operating devices aforementioned are adapted to be moved by a common operating mechanism. A single cam is centrally disposed beneath the supporting table, this cam being numbered 39 in Fig. 1. This cam is disposed in a horizontal plane and supported upon a sleeve shaft 41 journaled in bearing 42 in the frame 14'. It is adapted to be rotated by means of beveled gears 43, 44, on the sleeve 41, and by a shaft 45, respectively, the shaft 45 being journaled transversely of the frame 14 below the top 14' in bearings 46 and 47. At right angles to the shaft 45 is a power shaft 57 adapted to rotate the shaft 45 one revolution at a time through a one revolution clutch 48 of any well known type, this clutch being shown conventionally. As is well known a one revolution clutch is adapted to rotate a given part one revolution and then stop the rotation automatically.

In the upper face of the cam 39 is formed a cam groove 49 of the shape clearly shown in dotted lines in Fig. 2 and more clearly in Fig. 3. A cam roller 50 attached to each slide on which the carrier member 16 is adjustable, engages in this groove. By an inspection of the shape of the groove it will be seen that upon rotation of the cam 39 with its groove 49, the alternate carriers with their operating devices, including the turning-in tools and so forth, may be moved simultaneously inward to operating position while the intermediate carriers are held stationary after having advanced till the supporting frames 13 touch the box, and then the alternate carriers having been moved outwardly to normal position, the intermediate carriers may be moved inwardly to operating position while the alternate carriers are held stationary after having advanced till their supporting frames 13 touch the box. It will be observed further that these operations take place in the machine shown on one half revolution of the cam. The gearing 43, 44 is so proportioned that by one revolution of the shaft 45 through the one revolution clutch 48 the cam 39 is moved exactly one half revolution and then stopped.

With this understanding of the principal mechanisms of the machine and the means for operating them automatically, the operation of the several operating devices upon a box to be covered, will be readily observed from a consideration of Figs. 1, 4 and 5. In Fig. 1 a box 51 is shown in dotted lines supported bottom down upon the operating table 12, with the edges of an applied cover 52 projecting downwardly and upwardly from the sides of the box (see also Fig. 8). It is desired that these edges be turned in over the upper edges of the box and glued thereinto and to the bottom of the box. Through any desired operating means for the one revolution clutch 48, such for instance as the operating shaft 52ª and lever 53, Fig. 3, the clutch is actuated. Immediately the cam 39 is set in motion, and first the carriers 16 shown in elevation in Fig. 1 are moved inwardly carrying their operating devices to the positions shown in Fig. 4. When the bottom turning-in rollers 11, have moved inward in the operation of applying the bottom edges of the covering to the bottom of the box, the sections of the supporting frame 13 on each side of the box have at the same time been moved up into engagement with the vertical walls of the box, this movement, and the consequent pressure of the sections upon the box, as defined by the springs 28, is limited by the stops 34 previously adjusted. It is to be observed that all of the sections contact with the bevel cam groove 49, this groove being so shaped as to move all of the sections of the frame up to the box, although only the alternate turning-in devices are moved to operating positions. This is accomplished by giving to the intermediate carriers a lesser degree of movement than is given to the alternate carriers which are moved all the way up into operating positions. Just after the engagements of the sections 13 with the sides of the box, the upper turning-in rollers 10 engage the upper edges of the box covering, turn the same in over the upper edges of the ends of the box and then down and apply the same to the insides of the ends of the box, the rollers 10 being drawn suddenly but firmly downwardly just as soon as their center lines are projected beyond the edges of the box. The sliding supporting member 17 having been previously adjusted to bring the top of the supporting frame flush with the top of a box to be operated upon, there is no interference through the projection of the upper edge of the box through the frame, and a smooth and firm operation results. Immediately these operations have been performed, the alternate carriers, shown in Fig. 1, are carried outwardly again to normal position by the cam, the upper turning-in rollers by virtue of the pivot of their supporting arms being higher than the top of the box being operated upon, simply rolling upwardly and away from the box, and both lower and upper turning-in rollers pressing the edges of the covering by a firm rolling action as they recede. These rollers shown in Fig. 1 having taken their normal position, the intermediate rollers shown at right angles to them in Fig. 2, are moved by the cam into operative position together with the supporting frame 13 as an entirety, and in a manner entirely similar to that described in connection with the opposite pairs of rollers 10 and 11 shown in Fig. 1.

In connection with the machine as thus described, I provide means for automatically ejecting the finished product. To this end I make the table 12 movable vertically by supporting it on the upper end of a vertically reciprocable rod 54 which passes centrally through the bearing sleeve 41 which carries the cam 39. On the lower end of this rod I secure a cross head 55 by which the rod may be reciprocated, the cross head being guided by rods 56 on each side of the rod 54 and fixed to the member 57ª attached to the frame. To one side of the frame 14' below its top is a bracket 58 to which is pivoted a three armed lever 59, the central arm of which is connected by a pin and slot connection 60 with the rod 54. The lower arm 61 of this lever 59 is connected by the rod 62 to a disk 63 on a transverse shaft 64, the shaft terminating in the disk, so that the disk 63 may be rotated with the rod 62 without interferences from the shaft. This transverse shaft is geared to the upper shaft 57 through a one revolution clutch 65 (see Fig. 3) of any well known type. An operating member 66, (Fig. 1), for this clutch is provided, and its outer end 67, see Fig. 1, is extended upwardly into the path of movement of a lug 68 on a disk 69 on the shaft 45, the lug being beveled, as shown, to move the operating lever 66, laterally by means of its engagement with a pin 70, once each time the shaft 45 is operated. By adjusting the disk 69 upon the shaft, this operation of the one revolution clutch is timed to take place immediately after the edges of the box covering have been completely turned in and all of the operating devices have receded from the box. This table 12 is reciprocated upwardly once immediately upon completion of the movement of the operating devices to carry the finished box above the operating devices.

The third arm 71 of the lever 59 is arranged to operate an ejecting device for striking a box from the table when the latter reaches its uppermost position. The arm 71 is operatively connected to a motor mechanism 72, which mechanism is adapted to reciprocate the horizontally positioned rod 73 mounted to slide in the bearings 74 on the extension bracket 75 secured to the upper end of one of the carriers 16. The motor mechanism comprises an oscillatory rod 76, adapted to be moved inwardly toward the table by a spring 77 connected at one end to the rod 76, and at the other end to the upper end of the lever 78 pivoted at 79 intermediate its ends and connected at its lower end by link 80 to the arm 71. The shaft 79 is fixed in position, the lever being loosely journaled upon it. On one end the shaft 79 carries an adjustable collar 81 provided with a notch and shoulder 82. A latch member 83 pivoted at one end to the rod 76 is adapted to engage at its opposite end in this notch 82 when the rod 76 has been moved outwardly. When the rod is moved outwardly tension is thereby placed upon the spring 77. An actuating member 84, pivoted at one end to the rod 76 and engaged at its opposite end in notch 85 by pin 86 on the upper end of the lever 78, is adapted to move the rod 76 outwardly when the lever 78 has its lower end moved inwardly. An outward lateral extension 87 extending from the lever 78 carries an adjustable abutment screw 88 adapted to engage the underside of the latch 83 and raise the same from the notch 82.

When the turning-in of the back cover is completed, and just before the disk 69 stops, the operating lever 66 is moved aside by the lug 68 to let the clutch 65 into operative position. The disk 63 now makes one complete revolution drawing the rod 62 backwardly and swinging the oscillating lever 59, whereupon the arm 71 moves the lever 78 outwardly, elongates the spring 77 to exert a tension on rod 76, and finally brings the abutment 68 against the latch 83 releasing the same and admitting of the snapping of the pivoted rod 76 inwardly under the tension of the spring 77. The plunger 73 is, therefore, shot inwardly through the bearings 74. The swinging of the lever 59 raises the plunger rod 54 carrying the table 12 therewith above the turning-in devices, and the projection 87 carrying the abutment 88 is disposed at such an angle to the lever 78 that the abutment 88 does not strike the latch 83 until the box 51 upon the table 12 is carried upwardly opposite to the pusher rod 73, the latter being then released striking the box to discharge the same from the table 12.

As the disk 63 completes its revolution the lever 59 returns to normal position, moving the rod 54 and table 12 down and swinging the lever 78 inwardly and the pin 86 outwardly thus pushing the member 84 and rod 76 outwardly till the latch 83 drops and the shoulder and notch 82 intermesh. The spring 77 is normally inactive but under slight tension which is increased upon the outward movement of the lever 78.

It is very desirable that the operating devices for turning-in the box covering be not started upon a second operating cycle until the ejecting mechanism has been returned to normal position. To prevent this I provide a latch operable by the ejecting mechanism which prevents actuation of one revolution of the clutch 48 of the operating device until the ejecting mechanism has completed its operations. This latch is in the form of a pivoted angle lever 89 pivoted at 90 to the frame, and engaging at one end, by means of an anti-friction roller 91, the periphery of the disk 63, and at the other end the operating lever 53 for the clutch 48 as shown in Figs. 1 and 3. The periphery of the disk 63 is notched, as shown, in Fig. 1, at one point only to receive the roller 91 on the end of the lever 89. The upper end of the lever is provided with a projecting portion 92 which may be projected over the top of the operating lever 53 and prevent its being raised from the clutch 48 when the ejecting mechanism is in the course of operation. The disk 63 holds the projection 92 over the lever 53 and does not remove it until the cycle is completed and the disk having made one complete revolution the roller 91 again rests in the notch in the disk.

The above described form of my invention I find very efficient, but in its use in some instances, there has arisen certain trouble due to the sticking of the rollers 10 and 11 to the turned in portions 52 of the wrapper. Some times the needless excess of adhesive is pressed from the wrapper and is taken up by the covering rollers 10 and 11, and upon the outside of the portions of covering material 52, and the rollers having turned the portions 52 into contact with the box, will, on the return movement, stick to the previously turned-in portion, and wrinkle, tear or remove the same. Therefore, I have provided means for moving the rollers away from the turned-in portions prior to their removal from within the box on the return movement. This is embodied in the preferred form of my invention. This form is clearly shown in Fig. 1ᵃ, which is a view similar to Fig. 1, Fig. 3ᵃ which is a view similar to Fig. 3, Fig. 4ᵃ similar to Fig. 4, and Fig. 4ᵇ which is a plan view of the portion of the machine shown in Fig. 4ᵃ. Referring now to these figures of the drawings, it will be noted that all the parts, like those of the machine previously described, are designated by like numerals. Instead of the rod 20 each support 17 carries a transversely extending bar 93 upon which are slidably mounted two supporting arms 94. The upper rollers 10 are carried by brackets 95 of U-shape, as shown, pivoted at one end to the arms 94. The arms 94 are provided with upward extension 96 which support transverse rods 97. At opposite ends, these rods carry inwardly extending operating levers 98 connected by means of links 99 with the U-shaped brackets 95 carrying the rollers. The levers 98 are rigidly connected with the rods 97, which rods are journaled to turn in the projections 96. Also rigidly connected with each of the rods 97 is a rearwardly extending operating lever 100 which projects from the rods 97 at such a point as to clear the mechanism below them. The levers 100 are each connected at their outer ends to a link 101 extending downwardly through the table 14′ of the machine and connecting the cam levers 102 pivoted to the extensions 103 of the bracket 46. The cam levers are provided with rollers 104 which are engaged by a ring cam member 105 supported from the cam wheel 39. (See Figs. 1ᵃ and 3ᵃ). The cam 105 is so shaped on its under face as to depress the cam levers 102 immediately after the turning in rollers have reached their extreme inner position, as shown in full lines in Fig. 4ᵃ, and to raise the turning-in rollers immediately to the dotted line position shown in Fig. 4ᵃ, whereby the rollers are given return movement by the mechanisms previously described and moved without the range of the box. This mechanism has to do in this embodiment only with the upper turning-in rollers 10. For securing the right movement of the lower turning-in rollers 11 a different mechanism is used. The lower turning-in rollers 11 are carried between the links 106 on the ends of the inwardly extending arms 107, which are slidably mounted on a transversely extending bar 108, whereby adjustment of the arms 107 to said various lengths of rollers may be had in the same manner as the construction of mechanism previously described with reference to the arms 94 on the bars 93. The links 106 are forced outwardly by springs 109. A latch 110 connected with one of each pair of levers 106 is provided with a projection 112 engaging normally the rear side of the bar 108 and holding the lower turning-in rollers in normal position, as shown in Fig. 1ᵃ. Upon the inward movement of the turning-in rollers, which movement is accomplished by the same mechanism as that shown in Fig. 1, the lower turning-in rollers 11 after pressing the band to the underside of the box strike the table 12, and movement of the frame carrying them continues inwardly, thus inclining the roller frames to the position shown in Fig. 4ª whereupon the extension 112 of the latch 110 engages the return bar 108 and holds the frame. Thus the lower turning-in rollers are held away from the underside of the box after the turning-in operation on the bottom is completed and are maintained in this position during the return movement. Adjustable releasing stops 113 are provided on the frame of the machine, and the rear ends of the latches 110 are beveled as at 111 to engage these stops at the end of the outward movement of the lower rollers, whereby the latch is lifted, and the springs 109 return the rollers to the normal position shown in Fig. 1. Thus a most efficient turning-in action is had free from the troubles due to sticking of the rollers to the turned-in portions of wrappers. It will be noted that in this embodiment the sections of the frame 13 (see Fig. 1ª) are pressed inwardly by springs 114 of the extension type, which extend between projections 115 on the member 17, and 116 on the ends of the rods 28 which carry the sections 13. Collars 34ª are fixed upon the rods 28 and engage against the brackets 17 to limit the inward movement of the rods.

In Figs. 8 and 9 I show a still further modification of my invention. This modification is very similar to that shown in Figs. 1ª, 4ª and 4ᵇ. The essential difference is that the rollers 10 are not automatically moved away from the turned-in portions of the wrapper when the turning-in operation has been completed. To this end the connections 96 to 104, shown in Figs. 4ª and 4ᵇ, are omitted from the upper turning-in rollers, and the lower turning-in roller 11 is rigidly mounted on the member 36, similarly to the turning-in rollers of the form of Fig. 1. The upper turning-in rollers are carried by the claws 95 pivoted on the ends of the arms 94, slidably mounted on cross bars 93 similarly to the rollers 11 of the form of Figs. 1ª and 4ª, previously described. As in a machine of this form, the sections 13 of the frame are carried by rods 28 which are pressed inwardly by means of springs 114. As is the case with the form of Figs. 1, 2, 3, etc., this frame is limited in its inward movement by means of the upright stops 34, which are adjustable along the bed of the frame.

In Fig. 10 is shown a modified form of turning-in roller. Instead of the turning-in roller being made in a single piece, as indicated in the previous forms of the invention, it is made in two or more sections, 10ª, 10ᵇ, and the supporting arms 24 connect with them between the sections, whereby the endmost sections of the roller may extend all the way into the corners of the box. As shown in Fig. 10, section 10ᵇ is revolubly secured to the supporting arm 24 and the main section 10ª by means of a shaft 10ᶜ which passes axially through it, the supporting arm 24 being provided with an engaging shoulder as shown. Another section similar to 10ᵇ is, of course, provided on the opposite end of the main section 10ª.

While I have described the best forms of my invention known to me, it will be understood that my invention may be given other forms without departing in any wise from its generic spirit.

I desire to cover in the annexed claims all modifications of my invention which fall within its legal purview.

Having thus described the invention what is claimed as new is:—

1. A turning-in machine comprising a support for boxes, a frame carrying the support, members movable on the frame toward and from the support, turning-in tools carried on the members to turn in and apply the covering to the box, tool rests yieldingly mounted in the members for supporting the tools in normally raised position, and abutments adjustable on the frame adapted to engage the tool rests upon the inward movement of the members and release the turning-in tools at the edges of the box.

2. A turning-in machine comprising means for supporting a box to be operated upon, yieldingly depressed turning-in tools adapted to turn in the edges of a box covering, a sectional supporting frame adapted to support the sides of the box being operated upon and to support said turning-in tools flush with the box, and means for moving said turning-in tools from said sections whereby the tools automatically engage and turn in the edges of the box covering.

3. A turning-in mechanism for box covering machines comprising means for supporting the box to be operated upon, supports movable toward and from the opposite sides of the box, yieldably mounted turning-in tools having their operating portion normally resting upon and sustained by said supports with said portions in line with the upper edges of the box to be covered, and means for causing said tools to be moved from off the supports over the upper edges of the box to permit them to enter the latter whereby to turn the covering material over the upper edges of the box and apply said material to the inner walls thereof.

4. A turning-in machine comprising means for supporting a box to be operated upon, turning-in tools adapted to be reciprocated into and out of operative positions, with respect to said supporting means, carriers for said turning-in tools, and a common centrally located cam for reciprocating said carriers, said cam being adapted to first reciprocate the turning-in tools on the alternate sides of the perimeter of the box and hold the intermediate turning-in tools stationary, and thereafter to reciprocate the intermediate tools and hold the alternate tools stationary.

5. A turning-in machine comprising means for supporting a box to be operated upon, turning-in tools adapted to be reciprocated into and out of operative positions, with respect to said supporting means, carriers for said turning-in tools, a common centrally located cam for reciprocating said carriers, said cam being adapted to first reciprocate the turning-in tools on the alternate sides of the perimeter of the box and hold the intermediate turning-in tools stationary, and thereafter to reciprocate the intermediate tools and hold the alternate tools stationary, a source of power, and a gearing between the source of power and the said cam including a one revolution clutch, said gearing being of such proportions that the said cam is operated to cause a complete actuation of each turning-in tool so operating for each actuation of said clutch.

6. A turning-in machine comprising a frame provided with a table, a box support above the table, carriers upon the table movable toward and from the sides of the support, frame sections yieldingly mounted in the carriers for engagement against the sides of the box, shafts journaled transversely across the tops of the carriers, supporting arms mounted upon the shafts for adjustment toward and from each other, turning-in tools carried in the outer ends of the arms for engagement with the frame sections, tension means for the shafts to depress said arms, and a cam arranged in the frame and associated with the carriers to move the same toward and from the table, the inward movement of the carriers engaging the frame sections against the sides of the box to release said turning-in tools.

7. A turning-in machine comprising a frame having a table, a box support above the table, carriers arranged upon the table at the sides of the support for movement toward and from the same, frame sections slidably disposed in the carriers for engagement against the sides of the box, adjustable stops on the table for engagement with the frame sections to limit the inward movement of the same and prevent crushing of the box, and turning-in tools disposed upon the carriers and normally resting upon the frame sections, said frame sections adapted to move outwardly beneath the turning in tools to admit the latter to drop into the box upon the inward movement of the carrier.

8. A turning-in machine comprising a frame, a box support above the frame, turning-in tools mounted upon the frame for movement toward and from the sides of the support, an operating shaft, a second shaft normally connecting the turning-in tools with the operating shaft, a one revolution clutch arranged between the second shaft and the operating shaft, a support lifting mechanism, and means associated with the lifting mechanism and with the one revolution clutch to hold the same from engagement with the operating shaft during the operation of the lift mechanism.

9. In a turning-in machine, a vertically movable box support, turning-in mechanism for operation upon the box, an operating shaft, a clutch associated with the operating shaft and the turning-in mechanism, lifting mechanism for the support, and a latch arranged between the lifting mechanism and the clutch to hold the latter inoperative during the operation of the lifting mechanism.

10. In a turning-in machine, a movable box support, turning-in mechanism for operation upon the box, an operating shaft, a one revolution clutch associated with the operating shaft to actuate the turning-in mechanism, a lifting mechanism for the box support, said lifting mechanism being provided with a disk having a notch in one side, a latch hinged adjacent to the disk having one end movable against the periphery thereof and adapted to drop into the notch, the opposite end of the latch being associated with the clutch to release the same upon the movement of the opposite end of the latch into the notch, and an ejector connected to the disk for operation upon each revolution of the same.

11. A turning in machine comprising a support for boxes, turning in tools adapted to engage and turn in the edges of box coverings, said tools being pivotally supported, means for moving the supports to cause the tools to engage and turn in the edges of the box coverings, means for moving the tools about their pivots directly away from the turned in portions of the box coverings, retaining means holding said turning in tools away from said turned in portions during their return movement to normal position.

12. A turning in machine comprising a support for boxes, turning in tools adapted to engage and turn in the edges of box coverings, said tools being pivotally supported, means for moving the supports to cause the tools to engage and turn in the edges of the box coverings, means for moving the tools about their pivots directly away from the turned in portions of the box coverings, retaining means holding said turning in tools away from said turned in portions during their return movement to normal position, and releasing means acting on said retaining means to release said turning-in tools to normal position, operative at the end of their return movement.

13. In a box covering machine, a frame, a box support on the frame, slidable brackets arranged upon the frame at the opposite sides of the box support, an intermittently rotating cam carried upon the frame and having connection with the brackets to advance and retire the same, yielding frame sections carried upon the brackets for engagement against the sides of the box, upper turning-in rollers carried upon the brackets and resting upon the frame sections, and lower applying rollers upon the brackets for engagement beneath the bottom of the box.

14. In a box covering machine, a frame, box supporting means on the frame, slidable brackets upon the frame adapted for movement toward and from the sides of the box support, a cam upon the frame for connection with the brackets to operate the same, clamping frame sections carried upon the brackets to yieldingly engage against the sides of the box, and turning-in rollers hinged upon the brackets and being normally urged downward upon the frame sections and adapted for movement over the upper edge of the box, and lower rollers carried upon the brackets for engagement beneath the box.

15. In a box covering machine, a frame, a rotating cam on the frame, brackets slidable on the frame and having connection with the cam, whereby the brackets advance and retire with respect to one another, a box support arranged between the brackets, a clamping frame carried by the brackets for yielding engagement against the sides of the box, upper turning-in rollers carried upon the frame for movement with the brackets, said turning-in rollers being adapted for movement beyond the frame over the upper edge of the box, and lower rollers carried by the brackets engaging the bottom of the box.

16. In a box covering machine, pairs of brackets, a cam connected to the brackets and adapted to advance and retire the same, yieldable frame sections mounted upon the brackets for engagement against the sides of a box, and turning-in rollers carried by the brackets and resting upon the frame sections, said rollers adapted to move down within the box upon the engagement of the frame sections against the sides of the box.

17. In a box covering machine, a frame, an intermittently rotating cam upon the frame, slidable brackets upon the frame and having connection with the cam whereby the brackets are advanced and retired, presser strips carried upon the brackets for engagement against the sides of a box, and turning-in rollers hinged upon the brackets and being normally urged downward and resting upon the presser strips, said turning-in rollers being adapted for movement into the box upon the stoppage of the presser strips against the sides of the box.

18. In a box covering machine, pairs of brackets, a cam connected to the brackets, yieldable frame sections mounted upon the brackets for engagement against the sides of a box, and turning-in rollers carried by the brackets and resting upon the frame sections, said cam upon a partial turn being adapted to move said frame sections against the sides of a box to advance the opposite turning-in rollers beyond the frame sections over the edges of the box and to retract the sections and rollers, said cam upon further turning being adapted to again advance the sections and to move the intermediate turning-in rollers over the edges of the box.

19. In a turning-in machine, a movable box support, an operating shaft, a rotating disk operatively connected to said shaft, a three-armed pivoted lever having one arm connected to said disk whereby said lever is reciprocated, a connection between a second arm of said lever and said box support to reciprocate the latter upon the rotation of the disk, a fixed shaft, a second lever hinged at one end of the shaft and having its opposite end connected to the third arm of the three-armed lever, an oscillatory rod, a latch member pivoted upon the rod, an adjustable sleeve carried upon the fixed shaft and having a shoulder for the reception of said latch to hold the oscillatory lever outwardly, a spring carried upon the upper extremity of said second lever and having connection with the oscillatory rod to normally urge the same inwardly, a pin carried upon the outer end of said second lever, and an actuating member hinged upon the rod and having a notch at its extremity for the reception of the pin.

20. In a turning-in machine, a frame, a rotating disk mounted on the frame, a reciprocating plunger rod slidably mounted in the upper end of the frame, a motor mechanism connecting the plunger rod with the disk, a vertically movable box support associated with the motor mechanism to be raised thereby prior to the movement of the plunger rod, turning-in mechanism carried by the frame for operation against the sides of the box, an operating shaft, a one revolution clutch connecting the turning-in mechanism with the shaft, and means controlled by said disk for holding the clutch inoperative during the movement of said motor mechanism.

21. A turning-in machine, comprising a frame, a vertically movable box support, turning-in mechanism on the frame for operation upon the box, an operating shaft, a one-way clutch connecting the shaft to said turning-in mechanism, an ejector device arranged upon the frame for operation upon the raising of the box support, a motor mechanism associated with the ejector device and the vertically movable box support, and a disk connected to the motor mechanism and to the clutch for holding the same inoperative during the up and down movement of the box support and the operation of the ejector device.

22. In a turning-in machine, a frame, a vertically movable box support on the frame a motor mechanism on the frame associated with the box support, an ejector mechanism on the frame having connection with the motor mechanism to be operated thereby when said support is raised, a turning-in mechanism for operation against the sides of the box, an operating shaft, a clutch connecting the shaft with the turning-in mechanism and controlling means between the motor mechanism and the clutch for holding the latter inoperative during the movement of the motor mechanism.

In testimony whereof I have hereunto set my hand in presence of two subscribing witnesses.

JOHN WILLIAM NASMITH.

Witnesses:
 EWALD SIMPSON MOSELEY,
 MALCOLM SMETHURST.